(12) United States Patent
Toebes et al.

(10) Patent No.: US 7,471,840 B2
(45) Date of Patent: Dec. 30, 2008

(54) TWO-DIMENSIONAL VARIABLE LENGTH CODING OF RUNS OF ZERO AND NON-ZERO TRANSFORM COEFFICIENTS FOR IMAGE COMPRESSION

(75) Inventors: John A. Toebes, Cary, NC (US); Wen-hsiung Chen, Sunnyvale, CA (US); Fang Wu, Pleasanton, CA (US); Dov Rosenfeld, Oakland, CA (US)

(73) Assignee: Cisco Technology, Inc., San Jose, CA (US)

( * ) Notice: Subject to any disclaimer, the term of this patent is extended or adjusted under 35 U.S.C. 154(b) by 887 days.

(21) Appl. No.: 10/922,508

(22) Filed: Aug. 18, 2004

(65) Prior Publication Data
US 2006/0039621 A1    Feb. 23, 2006

(51) Int. Cl.
*G06K 9/36* (2006.01)
(52) U.S. Cl. ...................................... 382/245
(58) Field of Classification Search ................. 382/245
See application file for complete search history.

(56) References Cited

U.S. PATENT DOCUMENTS

| | | | |
|---|---|---|---|
| 4,420,771 A * | 12/1983 | Pirsch | 341/56 |
| 4,698,672 A | 10/1987 | Chen et al. | 358/136 |
| 4,706,265 A | 11/1987 | Furukawa | 375/122 |
| 4,725,815 A * | 2/1988 | Mitchell et al. | 341/67 |
| 4,813,056 A | 3/1989 | Fedele | 375/27 |
| 4,821,119 A | 4/1989 | Gharavi | 375/240.16 |
| 4,845,560 A | 7/1989 | Kondo et al. | 358/133 |
| 4,858,017 A | 8/1989 | Torbey | 358/426 |
| 4,920,426 A | 4/1990 | Hatori et al. | 358/433 |
| 4,922,510 A | 5/1990 | Brusewitz | 375/122 |

(Continued)

FOREIGN PATENT DOCUMENTS

| | | |
|---|---|---|
| EP | 0 266 049 A2 | 5/1988 |
| WO | WO 93/18616 | 9/1993 |
| WO | WO 03/090421 | 10/2003 |

OTHER PUBLICATIONS

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

(Continued)

*Primary Examiner*—Wenpeng Chen
(74) *Attorney, Agent, or Firm*—Dov Rosenfeld; Inventek

(57) ABSTRACT

A method, apparatus, and carrier medium to encode a series of quantized transform coefficients. The method includes identifying events that each includes a run of zero-valued coefficients preceding a run of one or more non-zero-valued coefficients, and for each such event, jointly encoding the run lengths of the preceding run of zero-valued coefficients and the following run of non-zero-valued coefficients with a codeword, such that for at least some events, relatively more likely-to-occur pairs of runlengths are encoded by a shorter codeword than relatively less likely-to-occur runlengths. The method further includes encoding each amplitude in the run of consecutive non-zero-valued coefficients, and encoding the signs of such coefficients. The method is applicable to encoding a region in the series where there is likely to be a cluster of non-zero-valued coefficients.

53 Claims, 12 Drawing Sheets

Table 5: Codes for events of runs of zeroes and non-zeroes

| | | Length of non-zero-value cluster | | | | | | | | | |
|---|---|---|---|---|---|---|---|---|---|---|---|
| | | 1 | 2 | 3 | 4 | 5 | 6 | 7 | 8 | 9 | ... |
| Length of preceding zeroes | 0 | C'(0,1) | C'(0,2) | C'(0,3) | C'(0,4) | C'(0,5) | C'(0,6) | C'(0,7) | C'(0,8) | ... | ... |
| | 1 | C'(1,1) | C'(1,2) | C'(1,3) | ... | ... | ... | ... | ... | ... | ... |
| | 2 | C'(2,1) | C'(2,2) | C'(2,3) | ... | ... | ... | ... | ... | ... | ... |
| | 3 | C'(3,1) | C'(3,2) | C'(3,3) | ... | ... | ... | ... | ... | ... | ... |
| | 4 | C'(4,1) | C'(4,2) | C'(4,3) | ... | ... | ... | ... | ... | ... | ... |
| | 5 | C'(5,1) | C'(5,2) | C'(5,3) | ... | ... | ... | ... | ... | ... | ... |
| | 6 | C'(6,1) | C'(6,2) | C'(6,3) | ... | ... | ... | ... | ... | ... | ... |
| | 7 | C'(7,1) | C'(7,2) | C'(7,3) | ... | ... | ... | ... | ... | ... | ... |
| | 8 | C'(8,1) | C'(8,2) | C'(8,3) | ... | ... | ... | ... | ... | ... | ... |
| | 9 | ... | ... | ... | ... | ... | ... | ... | ... | ... | ... |
| | ... | ... | ... | ... | ... | ... | ... | ... | ... | ... | ... |
| | ... | ... | ... | ... | ... | ... | ... | ... | ... | ... | ... |

U.S. PATENT DOCUMENTS

| | | | |
|---|---|---|---|
| 4,937,573 A | 6/1990 | Silvio et al. | 341/67 |
| 4,985,700 A | 1/1991 | Mikami | 341/59 |
| 4,985,766 A | 1/1991 | Morrison et al. | 358/133 |
| 5,006,930 A | 4/1991 | Stroppiana et al. | 358/133 |
| 5,045,938 A | 9/1991 | Sugiyama | 358/133 |
| 5,062,152 A | 10/1991 | Faulkner | 359/185 |
| 5,086,488 A | 2/1992 | Kato et al. | 382/56 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,253,058 A * | 10/1993 | Gharavi | 375/240.12 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,640,420 A | 6/1997 | Jung | 375/240 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/51 |
| 5,731,836 A | 3/1998 | Lee | 348/402 |
| 5,740,283 A | 4/1998 | Meeker | 382/248 |
| 5,742,342 A * | 4/1998 | Jung | 375/240.03 |
| 5,751,232 A | 5/1998 | Inoue et al. | 341/63 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/423 |
| 5,793,897 A | 8/1998 | Jo et al. | 382/246 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,215,424 B1 * | 4/2001 | Cooper | 341/67 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,304,607 B1 | 10/2001 | Talluri et al. | 375/240.27 |
| 6,339,386 B1 | 1/2002 | Cho | 341/67 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,477,280 B1 | 11/2002 | Malvar | 382/245 |
| 6,771,828 B1 | 8/2004 | Malvar | 382/240 |
| 7,203,372 B1 * | 4/2007 | Chen et al. | 382/244 |
| 7,212,681 B1 * | 5/2007 | Chen et al. | 382/248 |
| 2004/0228540 A1 | 11/2004 | Chen et al. | 382/246 |

OTHER PUBLICATIONS

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

M. Luttrell, J. Wen, H. Yao, and J. Villasen: "Robust Low Bit Rate Wireless Video Communications," Final Report, Project 97-193, University of California MICRO project, available on http://www.ucop.edu/research/micro/97_98/97_193.pdf.

P.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videolocus.com.

"MPEG-1 Video Codec", pp. 1-8, available on http://www.cmlab.csie.ntu.edu.tw/cml/dsp/training/coding/mpeg1/.

K. Takagi, "Reversiblity of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

* cited by examiner

Table 1: Event statistics for 2D-VLC coding

| Runlength of preceding 0s | Coeff. Amplitude | | | | | | |
|---|---|---|---|---|---|---|---|
| | 1 | 2 | 3 | 4 | 5 | 6 | 7 |
| 0 | $S_{2D}(0,1)$ | $S_{2D}(0,2)$ | $S_{2D}(0,3)$ | $S_{2D}(0,4)$ | $S_{2D}(0,5)$ | $S_{2D}(0,6)$ | $S_{2D}(0,7)$ |
| 1 | $S_{2D}(1,1)$ | $S_{2D}(1,2)$ | $S_{2D}(1,3)$ | $S_{2D}(1,4)$ | $S_{2D}(1,5)$ | $S_{2D}(1,6)$ | $S_{2D}(1,7)$ |
| 2 | $S_{2D}(2,1)$ | $S_{2D}(2,2)$ | $S_{2D}(2,3)$ | $S_{2D}(2,4)$ | $S_{2D}(2,5)$ | $S_{2D}(2,6)$ | $S_{2D}(2,7)$ |
| 3 | $S_{2D}(3,1)$ | $S_{2D}(3,2)$ | $S_{2D}(3,3)$ | $S_{2D}(3,4)$ | $S_{2D}(3,5)$ | $S_{2D}(3,6)$ | $S_{2D}(3,7)$ |
| 4 | $S_{2D}(4,1)$ | $S_{2D}(4,2)$ | $S_{2D}(4,3)$ | $S_{2D}(4,4)$ | $S_{2D}(4,5)$ | $S_{2D}(4,6)$ | $S_{2D}(4,7)$ |
| 5 | $S_{2D}(5,1)$ | $S_{2D}(5,2)$ | $S_{2D}(5,3)$ | $S_{2D}(5,4)$ | $S_{2D}(5,5)$ | $S_{2D}(5,6)$ | $S_{2D}(5,7)$ |
| 6 | $S_{2D}(6,1)$ | $S_{2D}(6,2)$ | $S_{2D}(6,3)$ | $S_{2D}(6,4)$ | $S_{2D}(6,5)$ | $S_{2D}(6,6)$ | $S_{2D}(6,7)$ |
| 7 | $S_{2D}(7,1)$ | $S_{2D}(7,2)$ | $S_{2D}(7,3)$ | $S_{2D}(7,4)$ | $S_{2D}(7,5)$ | $S_{2D}(7,6)$ | $S_{2D}(7,7)$ |
| 8 | $S_{2D}(8,1)$ | $S_{2D}(8,2)$ | $S_{2D}(8,3)$ | $S_{2D}(8,4)$ | $S_{2D}(8,5)$ | $S_{2D}(8,6)$ | $S_{2D}(8,7)$ |
| 9 | $S_{2D}(9,1)$ | $S_{2D}(9,2)$ | $S_{2D}(9,3)$ | $S_{2D}(9,4)$ | $S_{2D}(9,5)$ | $S_{2D}(9,6)$ | $S_{2D}(9,7)$ |
| . | . | . | . | . | . | . | . |

FIG. 3 (Prior Art)

Table 2: 2D-VLC Codes

| Runlength of preceding 0s | Coeff. Amplitude | | | | | | | |
|---|---|---|---|---|---|---|---|---|
| | 1 | 2 | 3 | 4 | 5 | 6 | 7 | . |
| 0 | $C_{2D}(0,1)$ | $C_{2D}(0,2)$ | $C_{2D}(0,3)$ | $C_{2D}(0,4)$ | $C_{2D}(0,5)$ | $C_{2D}(0,6)$ | $C_{2D}(0,7)$ | . |
| 1 | $C_{2D}(1,1)$ | $C_{2D}(1,2)$ | $C_{2D}(1,3)$ | $C_{2D}(1,4)$ | $C_{2D}(1,5)$ | $C_{2D}(1,6)$ | $C_{2D}(1,7)$ | . |
| 2 | $C_{2D}(2,1)$ | $C_{2D}(2,2)$ | $C_{2D}(2,3)$ | $C_{2D}(2,4)$ | $C_{2D}(2,5)$ | $C_{2D}(2,6)$ | $C_{2D}(2,7)$ | . |
| 3 | $C_{2D}(3,1)$ | $C_{2D}(3,2)$ | $C_{2D}(3,3)$ | $C_{2D}(3,4)$ | $C_{2D}(3,5)$ | $C_{2D}(3,6)$ | $C_{2D}(3,7)$ | . |
| 4 | $C_{2D}(4,1)$ | $C_{2D}(4,2)$ | $C_{2D}(4,3)$ | $C_{2D}(4,4)$ | $C_{2D}(4,5)$ | $C_{2D}(4,6)$ | $C_{2D}(4,7)$ | . |
| 5 | $C_{2D}(5,1)$ | $C_{2D}(5,2)$ | $C_{2D}(5,3)$ | $C_{2D}(5,4)$ | $C_{2D}(5,5)$ | $C_{2D}(5,6)$ | $C_{2D}(5,7)$ | . |
| 6 | $C_{2D}(6,1)$ | $C_{2D}(6,2)$ | $C_{2D}(6,3)$ | $C_{2D}(6,4)$ | $C_{2D}(6,5)$ | $C_{2D}(6,6)$ | $C_{2D}(6,7)$ | . |
| 7 | $C_{2D}(7,1)$ | $C_{2D}(7,2)$ | $C_{2D}(7,3)$ | $C_{2D}(7,4)$ | $C_{2D}(7,5)$ | $C_{2D}(7,6)$ | $C_{2D}(7,7)$ | . |
| 8 | $C_{2D}(8,1)$ | $C_{2D}(8,2)$ | $C_{2D}(8,3)$ | $C_{2D}(8,4)$ | $C_{2D}(8,5)$ | $C_{2D}(8,6)$ | $C_{2D}(8,7)$ | . |
| 9 | $C_{2D}(9,1)$ | $C_{2D}(9,2)$ | $C_{2D}(9,3)$ | $C_{2D}(9,4)$ | $C_{2D}(9,5)$ | $C_{2D}(9,6)$ | $C_{2D}(9,7)$ | . |
| . | . | . | . | . | . | . | . | |

FIG. 4 (Prior Art)

Table 3A: Examples of 2 consecutive coefficients

| Notation | Pattern |
|---|---|
| R'(0,2) | xx |
| R'(1,1) | 0x |

FIG. 5A

Table 3B: Examples of 3 consecutive coefficients

| Notation | Pattern |
|---|---|
| R'(0,3) | xxx |
| R'(1,2) | 0xx |
| R'(2,1) | 00x |

FIG. 5B

Table 3C: Examples of 4 consecutive coefficients

| Notation | Pattern |
|---|---|
| R'(0,4) | xxxx |
| R'(1,3) | 0xxx |
| R'(2,2) | 00xx |
| R'(3,1) | 000x |

FIG. 5C

Table 3D: Examples of 5 consecutive coefficients

| Notation | Pattern |
|---|---|
| R'(0,5) | xxxxx |
| R'(1,4) | 0xxxx |
| R'(2,3) | 00xxx |
| R'(3,2) | 000xx |
| R'(4,1) | 0000x |

FIG. 5D

Table 4: Statistics for events of runs of zeroes and non-zeroes

| Length of preceding zeroes | Length of non-zero-value cluster | | | | | | | | | |
|---|---|---|---|---|---|---|---|---|---|---|
| | 1 | 2 | 3 | 4 | 5 | 6 | 7 | 8 | 9 | ... |
| 0 | S'(0,1) | S'(0,2) | S'(0,3) | S'(0,4) | S'(0,5) | S'(0,6) | S'(0,7) | S'(0,8) | ... | ... |
| 1 | S'(1,1) | S'(1,2) | S'(1,3) | ... | ... | ... | ... | ... | ... | ... |
| 2 | S'(2,1) | S'(2,2) | S'(2,3) | ... | ... | ... | ... | ... | ... | ... |
| 3 | S'(3,1) | S'(3,2) | S'(3,3) | ... | ... | ... | ... | ... | ... | ... |
| 4 | S'(4,1) | S'(4,2) | S'(4,3) | ... | ... | ... | ... | ... | ... | ... |
| 5 | S'(5,1) | S'(5,2) | S'(5,3) | ... | ... | ... | ... | ... | ... | ... |
| 6 | S'(6,1) | S'(6,2) | S'(6,3) | ... | ... | ... | ... | ... | ... | ... |
| 7 | S'(7,1) | S'(7,2) | S'(7,3) | ... | ... | ... | ... | ... | ... | ... |
| 8 | S'(8,1) | S'(8,2) | S'(8,3) | ... | ... | ... | ... | ... | ... | ... |
| 9 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

FIG. 6

Table 5: Codes for events of runs of zeroes and non-zeroes

| Length of preceding zeroes | Length of non-zero-value cluster | | | | | | | | | |
|---|---|---|---|---|---|---|---|---|---|---|
| | 1 | 2 | 3 | 4 | 5 | 6 | 7 | 8 | 9 | ... |
| 0 | C'(0,1) | C'(0,2) | C'(0,3) | C'(0,4) | C'(0,5) | C'(0,6) | C'(0,7) | C'(0,8) | ... | ... |
| 1 | C'(1,1) | C'(1,2) | C'(1,3) | ... | ... | ... | ... | ... | ... | ... |
| 2 | C'(2,1) | C'(2,2) | C'(2,3) | ... | ... | ... | ... | ... | ... | ... |
| 3 | C'(3,1) | C'(3,2) | C'(3,3) | ... | ... | ... | ... | ... | ... | ... |
| 4 | C'(4,1) | C'(4,2) | C'(4,3) | ... | ... | ... | ... | ... | ... | ... |
| 5 | C'(5,1) | C'(5,2) | C'(5,3) | ... | ... | ... | ... | ... | ... | ... |
| 6 | C'(6,1) | C'(6,2) | C'(6,3) | ... | ... | ... | ... | ... | ... | ... |
| 7 | C'(7,1) | C'(7,2) | C'(7,3) | ... | ... | ... | ... | ... | ... | ... |
| 8 | C'(8,1) | C'(8,2) | C'(8,3) | ... | ... | ... | ... | ... | ... | ... |
| 9 | ... | ... | ... | ... | ... | ... | ... | ... | ... | ... |
| ... | ... | ... | ... | ... | ... | ... | ... | ... | ... | ... |
| ... | ... | ... | ... | ... | ... | ... | ... | ... | ... | ... |

FIG. 7

Table 6A: Examples of 2 consecutive coefficients

| Notation | Pattern |
|---|---|
| R(0,1) | x0 |

FIG. 8A

Table 6B: Examples of 3 consecutive coefficients

| Notation | Pattern |
|---|---|
| R(0,2) | xx0 |
| R(1,1) | 0x0 |

FIG. 8B

Table 6C: Examples of 4 consecutive coefficients

| Notation | Pattern |
|---|---|
| R(0,3) | xxx0 |
| R(1,2) | 0xx0 |
| R(2,1) | 00x0 |

FIG. 8C

Table 6D: Examples of 5 consecutive coefficients

| Notation | Pattern |
|---|---|
| R(0,4) | xxxx0 |
| R(1,3) | 0xxx0 |
| R(2,2) | 00xx0 |
| R(3,1) | 000x0 |

FIG. 8D

Table 6E: Examples of six consecutive coefficients

| Notation | Pattern |
|---|---|
| R(0,5) | xxxxx0 |
| R(1,4) | 0xxxx0 |
| R(2,3) | 00xxx0 |
| R(3,2) | 000xx0 |
| R(4,1) | 0000x0 |

FIG. 8E

Table 6F: Examples of 12 consecutive coefficients (the maximum)

| Notation | Pattern | Comment |
|---|---|---|
| R(0,12) | xxxxxxxxxxxx | No zero at end; avoids escape |
| R(0,11) | xxxxxxxxxxx0 | |
| R(1,11) | 0xxxxxxxxxxx | No zero at end; avoids escape |
| R(1,10) | 0xxxxxxxxxx0 | |
| R(2,10) | 00xxxxxxxxxx | No zero at end; avoids escape |
| R(2,9) | 00xxxxxxxxx0 | |
| ... | | |
| R(6,6) | 000000xxxxxx | No zero at end; avoids escape |
| R(6,5) | 000000xxxxx0 | |
| ... | | |
| R(10,2) | 0000000000xx | No zero at end; avoids escape |
| R(10,1) | 0000000000x0 | |
| R(11,1) | 00000000000x | No zero at end; avoids escape |
| R(12,0) | 000000000000 | All zeroes |

FIG. 8F

Table 7: Statistics for events of runs of zeroes and non-zeroes follwed by a zero

| | \ | Length of non-zero-value cluster | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Length of preceding zeroes | 0 | S(0,1) | S(0,2) | S(0,3) | S(0,4) | S(0,5) | S(0,6) | S(0,7) | S(0,8) | S(0,9) | S(0,10) | S(0,11) | S(0,12) |
| | 1 | S(1,1) | S(1,2) | S(1,3) | S(1,4) | S(1,5) | S(1,6) | S(1,7) | S(1,8) | S(1,9) | S(1,10) | S(1,11) | |
| | 2 | S(2,1) | S(2,2) | S(2,3) | S(2,4) | S(2,5) | S(2,6) | S(2,7) | S(2,8) | S(2,9) | S(2,10) | | |
| | 3 | S(3,1) | S(3,2) | S(3,3) | S(3,4) | S(3,5) | S(3,6) | S(3,7) | S(3,8) | S(3,9) | | | |
| | 4 | S(4,1) | S(4,2) | S(4,3) | S(4,4) | S(4,5) | S(4,6) | S(4,7) | S(4,8) | | | | |
| | 5 | S(5,1) | S(5,2) | S(5,3) | S(5,4) | S(5,5) | S(5,6) | S(5,7) | | | | | |
| | 6 | S(6,1) | S(6,2) | S(6,3) | S(6,4) | S(6,5) | S(6,6) | | | | | | |
| | 7 | S(7,1) | S(7,2) | S(7,3) | S(7,4) | S(7,5) | | | | | | | |
| | 8 | S(8,1) | S(8,2) | S(8,3) | S(8,4) | | | | | | | | |
| | 9 | S(9,1) | S(9,2) | S(9,3) | | | | | | | | | |
| | 10 | S(10,1) | S(10,2) | | | | | | | | | | |
| | 11 | S(11,1) | | | | | | | | | | | |
| | 12 | S(12,0) | | | | | | | | | | | |

FIG. 9

Table 8: Codes for events of runs of zeroes and non-zeroes follwed by a zero

| Length of preceding zeroes \ Length of non-zero-value cluster | 1 | 2 | 3 | 4 | 5 | 6 | 7 | 8 | 9 | 10 | 11 | 12 |
|---|---|---|---|---|---|---|---|---|---|---|---|---|
| 0 | C(0,1) | C(0,2) | C(0,3) | C(0,4) | C(0,5) | C(0,6) | C(0,7) | C(0,8) | C(0,9) | C(0,10) | C(0,11) | C(0,12) |
| 1 | C(1,1) | C(1,2) | C(1,3) | C(1,4) | C(1,5) | C(1,6) | C(1,7) | C(1,8) | C(1,9) | C(1,10) | C(1,11) | |
| 2 | C(2,1) | C(2,2) | C(2,3) | C(2,4) | C(2,5) | C(2,6) | C(2,7) | C(2,8) | C(2,9) | C(2,10) | | |
| 3 | C(3,1) | C(3,2) | C(3,3) | C(3,4) | C(3,5) | C(3,6) | C(3,7) | C(3,8) | C(3,9) | | | |
| 4 | C(4,1) | C(4,2) | C(4,3) | C(4,4) | C(4,5) | C(4,6) | C(4,7) | C(4,8) | | | | |
| 5 | C(5,1) | C(5,2) | C(5,3) | C(5,4) | C(5,5) | C(5,6) | C(5,7) | | | | | |
| 6 | C(6,1) | C(6,2) | C(6,3) | C(6,4) | C(6,5) | C(6,6) | | | | | | |
| 7 | C(7,1) | C(7,2) | C(7,3) | C(7,4) | C(7,5) | | | | | | | |
| 8 | C(8,1) | C(8,2) | C(8,3) | C(8,4) | | | | | | | | |
| 9 | C(9,1) | C(9,2) | C(9,3) | | | | | | | | | |
| 10 | C(10,1) | C(10,2) | | | | | | | | | | |
| 11 | C(11,1) | | | | | | | | | | | |
| 12 | C(12,0) | | | | | | | | | | | |

FIG. 10

| Pattern | Num. |
|---|---|
| xxxxxxxxxxx | 460 |
| 0xxxxxxxxxx | 16 |
| xxxxxxxxxx0 | 119 |
| 00xxxxxxxxx | 0 |
| 0xxxxxxxxx0 | 6 |
| 000xxxxxxxx | 0 |
| 00xxxxxxxx0 | 1 |
| 0000xxxxxxx | 0 |
| 000xxxxxxx0 | 0 |
| 00000xxxxxx | 0 |
| 0000xxxxxx0 | 0 |
| 000000xxxxx | 0 |
| 00000xxxxx0 | 0 |
| 0000000xxxx | 0 |
| 000000xxxx0 | 1 |
| 00000000xxx | 0 |
| 0000000xxx0 | 1 |
| 000000000xx | 0 |
| 00000000xx0 | 2 |
| 0000000000x | 5 |
| 000000000x0 | 5 |
| 00000000000x | 173 |
| 0000000000x0 | 76 |
| xxxxxxxxx0 | 203 |
| 0xxxxxxxx0 | 16 |
| 00xxxxxxx0 | 1 |
| 000xxxxxx0 | 0 |

| Pattern | Num. |
|---|---|
| 0000xxxxxx0 | 0 |
| 00000xxxxx0 | 0 |
| 000000xxxx0 | 0 |
| 0000000xxx0 | 9 |
| 00000000xx0 | 46 |
| 000000000x0 | 176 |
| xxxxxxxx0 | 378 |
| 0xxxxxxx0 | 24 |
| 00xxxxxx0 | 4 |
| 000xxxxx0 | 4 |
| 0000xxxx0 | 1 |
| 00000xxx0 | 3 |
| 000000xx0 | 31 |
| 0000000x0 | 116 |
| 00000000x0 | 841 |
| xxxxxxx0 | 231 |
| 0xxxxxx0 | 41 |
| 00xxxxx0 | 13 |
| 000xxxx0 | 6 |
| 0000xxx0 | 4 |
| 00000xx0 | 4 |
| 000000x0 | 75 |
| 0000000x0 | 784 |
| xxxxxx0 | 351 |
| 0xxxxx0 | 84 |
| 00xxxx0 | 44 |
| 000xxx0 | 41 |

| Pattern | Num. |
|---|---|
| 0000xxx0 | 25 |
| 00000xx0 | 71 |
| 000000x0 | 818 |
| xxxxx0 | 702 |
| 0xxxx0 | 201 |
| 00xxx0 | 100 |
| 000xx0 | 80 |
| 0000x0 | 313 |
| 00000x0 | 1322 |
| xxxx0 | 2314 |
| 0xxx0 | 583 |
| 00xx0 | 314 |
| 000x0 | 545 |
| 0000x0 | 2217 |
| xxx0 | 2848 |
| 0xx0 | 1457 |
| 00x0 | 1033 |
| 000x0 | 3108 |
| xx0 | 4113 |
| 0x0 | 4139 |
| 00x0 | 4662 |
| xx0 | 7918 |
| 0x0 | 13629 |
| x0 | 12380 |
| skip | 8363 |
| EOB | 28001 |

FIG. 11

TWO-DIMENSIONAL VARIABLE LENGTH CODING OF RUNS OF ZERO AND NON-ZERO TRANSFORM COEFFICIENTS FOR IMAGE COMPRESSION

RELATED PATENT APPLICATIONS

This invention is related to concurrently filed U.S. patent application Ser. No. 10/922,507 to inventors Chen, et al. titled VIDEO CODING USING MULTI-DIMENSIONAL AMPLITUDE CODING AND 2-D NON-ZERO/ZERO CLUSTER POSITION CODING, U.S. patent application Ser. No. 10/922,507 is incorporated herein by reference, except any material incorporated by reference in U.S. patent application Ser. No. 10/922,507 and not explicitly incorporated by reference in the present disclosure.

BACKGROUND

The present invention relates to image coding, and in particular to variable length coding of an ordered series of quantized transform coefficients of a transform of a block of image data.

Two-dimensional variable length coding, referred to as 2D-VLC, has been widely used to code quantized transform coefficients. In traditional 2D-VLC, statistics are collected or assumed of events that include a run of consecutive zero-valued coefficients followed by a single non-zero amplitude coefficient that follows the run length. The ordering of the series of quantized transform coefficients is along a pre-selected path, e.g., a zig-zag path, in the two-dimensional path of the transform. Thus, in a typical implementation, a two-dimensional table consisting of the ending amplitude and the run-length of the preceding consecutive zero-valued coefficients is constructed and variable length codes, such as optimal Huffman codes or arithmetic codes, are assigned according to the assumed or measured statistics to form the 2D-VLC table for the subsequent encoding process. Shorter code lengths are used for the more likely-to-occur, e.g., more frequently occurring events.

2D-VLC is used in common transform coding methods, such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Interframe and intraframe images typically have different 2D-VLC tables. The DC component is typically separately encoded. Furthermore, the 2D-VLC table may be truncated so that the least frequently occurring events use an escape code followed by a fixed length code. A special "EOB" code is used to indicate the end of the block when all remaining coefficients are zero.

FIG. 1 shows how a table lookup may be used to implement a 2D-VLC scheme. Prior to the table look up, the runlength of zero amplitudes preceding any non-zero amplitude and the non-zero amplitude are determined. The table look up uses a 2D table for those likely-to-occur events encoded using variable length encoding. An escape code together with a fixed length code is used for relatively less likely-to-occur combinations.

One advantage of traditional 2D-VLC is that the position of each non-zero-valued quantized coefficient and its amplitude are coded simultaneously, which generally results in shorter code lengths than using a separate code, e.g., a VLC code for each non-zero-valued coefficient and coefficient amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example, described one form of a two-dimensional variable length coding method.

Extensions and variations to the common 2D-VLC method are known. For example, the ITU H.263 compression standard defines one such variation sometimes called three-dimensional VLC (3D-VLC). See PCT patent publication WO 9318616 published Sep. 16, 1993 titled PICTURE DATA ENCODING METHOD and also the ITU-T H.263 standard. In 3D-VLC, each symbol ("event") is a triplet (LAST, RUN, LEVEL) that includes: LAST, a binary flag that indicates whether or not the current non-zero amplitude-value is the last non-zero-valued coefficient in the block, RUN, the runlength of zero-value coefficients that precede the current non-zero amplitude, i.e., the number of zeroes since the last non-zero coefficient amplitude, and LEVEL, the current non-zero coefficient amplitude value. Thus, there is no need for a separate EOB codeword; whether or not the non-zero-valued coefficient is the last one is incorporated into the event.

FIG. 2 shows how a table lookup may be used to implement 3D-VLC.

One deficiency of 2D-VLC is that every non-zero-valued coefficient needs to be accompanied by a runlength code to identify its position, in the form of the number of preceding zero-valued coefficients.

In block based transform coding, there often is a region, e.g., a low-frequency region along the ordering in which non-zero-valued coefficients tend to cluster, i.e., there are often a number of consecutive non-zero-valued coefficients along the low frequency region of the pre-determined path. Each one of a number of such consecutive non-zero-valued coefficients would require the same number of codewords representing the position and amplitude.

U.S. patent application Ser. No. 10/342,537 to inventors Chen et al., filed Jan. 15, 2003 and titled AN EXTENSION OF TWO-DIMENSIONAL VARIABLE LENGTH CODING FOR IMAGE COMPRESSION describes a method called the "Extended 2D-VLC Method" herein that includes encoding repetitions of some non-zero coefficient values. One variant of the Extended 2D-VLC method provides codes for all the possible amplitude variations of consecutive coefficients that follow a set of zero-valued coefficients. This effectively reduces the runlength to 1 for all cases. The difficulty of this approach is that there are enormous numbers of patterns that can be generated from the amplitudes of consecutive coefficients. For example, with 32 quantization levels as defined in many common video coding standards, there are in the order of $32^n$ patterns that can be generated from n consecutive coefficients. As such, in a practical implementation, only a limited number of the most likely-to-occur non-zero amplitude values, such as 1 and 2, and a limited number of lengths of consecutive non-zero-values, such as 3 or 4 consecutive values, are regrouped for pattern matching.

Furthermore, in coding, while there may be a region where there are clusters of non-zero-valued coefficients, there is also likely to be a high frequency region where any non-zero-valued coefficients are likely to be scattered.

With these observations in mind, U.S. patent application Ser. No. 10/869,229 to inventors Chen et al., filed Jun. 15, 2004 and titled A HYBRID VARIABLE LENGTH CODING METHOD FOR LOW BIT RATE VIDEO CODING, was developed to encode the position and amplitude of quantized transform coefficients separately and to take advantage of the nature of the distribution of the transform coefficients in the low frequency and high frequency regions. U.S. patent application Ser. No. 10/869,229 is incorporated herein by reference, except any material incorporated by reference in U.S. patent application Ser. No. 10/869,229 and not explicitly incorporated by reference in the present disclosure. The methods described in U.S. patent application Ser. No. 10/869,229 are each and collectively called the "Basic Hybrid VLC Method" herein.

U.S. patent application Ser. No. 10/898,654 to inventors Chen et al., filed Jul. 22, 2004 and titled AN EXTENDED HYBRID VARIABLE LENGTH CODING METHOD FOR LOW BIT RATE VIDEO CODING, was invented, and provides an alternative coding method for the high frequency region by taking advantage of the very few amplitude values in the high frequency region, especially, for example, for low bit rate and interframe applications. U.S. patent application Ser. No. 10/898,654 is incorporated herein by reference, except any material incorporated by reference in U.S. patent application Ser. No. 10/898,654 and not explicitly incorporated by reference in the present disclosure. The methods described in U.S. patent application Ser. No. 10/898,654 are each and collectively called the "Extended Hybrid VLC Method" herein.

In one embodiment of the above-mentioned Basic Hybrid VLC Method, two independent types of coding schemes are introduced to code the quantized coefficients along the path. A boundary is established along the path to define two regions, e.g., a low frequency region and a high frequency region. The boundary can be made adaptive to the video depending on a number of factors such as intraframe coding or interframe coding, standard definition television (SDTV) or high definition television (HDTV), complex scene or simple scene, high bit rate coding or low bit rate coding, and so forth. In one embodiment, the encoding of the quantized coefficients in the low-frequency region includes coding the positions of consecutive non-zero-valued coefficients and the positions of consecutive zero-valued coefficients using a run-length coding method of a first type and a run-length coding method of a second type. The encoding further includes coding the amplitude values and sign of the non-zero-valued coefficients. In the high-frequency region, in one embodiment, the encoding of coefficients in the high frequency region includes encoding the positions of runs of none or more consecutive zero-valued coefficients using a run-length coding method of a third type. The encoding further includes coding the amplitude values and sign of the non-zero-valued coefficients.

In one embodiment of the above-mentioned Extended Hybrid VLC Method, a coding method is used in the second region that takes into account that almost all non-zero-valued coefficients in the high frequency region are ±1. No amplitude coding is needed to encode runs of consecutive zeroes that end in a coefficient of amplitude 1. An exception (escape) code is included to encode those rare non-zero-valued coefficients that have values other than ±1.

Although the Basic Hybrid VLC Method and the Extended Hybrid VLC Method provide potential improvement beyond using a single 2D-VLC technique for all quantized coefficients in a block, these methods may not be optimal for various reasons, including that the dynamic nature of the quantized block coefficients may not exactly match the model assumed in a pre-determined coding technique. By the dynamic nature, we mean changed in block-to-block, and image to image in one or more of the cluster or scatter of the coefficients in a region, in whether a region has significant consecutive runs of non-zero-valued coefficients or mostly isolated non-zero-valued coefficients, in whether a region has coefficients with amplitudes dominated by a few values or even a single value, and so forth.

U.S. patent application Ser. No. 10/910,712 to inventors Chen et al., filed Aug. 3, 2004 and titled VIDEO COMPRESSION USING MULTIPLE VARIABLE LENGTH CODING PROCESSES FOR MULTIPLE CLASSES OF TRANSFORM COEFFICIENT BLOCKS, describes a method that includes classifying each block of quantized coefficients to one of a plurality of classes. Each class has a corresponding method (a coding strategy) applicable to that type of data, e.g., to the types of statistical distributions of zero and non-zero-valued coefficients, including whether the non-zero coefficients are clustered or scattered, whether the non-zero-valued coefficients, other than the DC value, are dominated with amplitide-1-coefficients, and whether or not a breakpoint can be established that defines a first region wherein the non-zero-coefficients are clustered, and a second region wherein the non-zero valued coefficients are scattered. Thus, one of a plurality of coding strategies is applied according to the nature of the coefficients. In one embodiment, the classifying compares the results of applying the corresponding strategies, and selects the class and thus the strategy according to which corresponding strategy provides the best compression. U.S. patent application Ser. No. 10/910,712 is incorporated herein by reference, except any material incorporated by reference in U.S. patent application Ser. No. 10/910,712 and not explicitly incorporated by reference in the present disclosure. The methods described in U.S. patent application Ser. No. 10/910,712 are each and collectively called the "Multi-Class VLC Method" herein.

In the Basic Hybrid VLC Method and the Extended Hybrid VLC Method, the consecutive non-zero-valued coefficients and the consecutive zero-valued coefficients in the low frequency region are coded alternatively using two independent one-dimensional variable length coding methods. It would be desirable to pair the consecutive non-zero-valued coefficients and zero-valued coefficients as a single event and apply a single variable length to the pair.

Thus there is still room for improvement in how to encode a series of quantized coefficients, in particular for a series in which there are clusters of non-zero-valued coefficients.

Thus, there is still a need in the art for variable length coding methods applicable to quantized coefficients for transform image coding. Such methods can be added to the corresponding methods in the above-described Multi-Class VLC Method.

Furthermore, one or more patents describing some existing 2D-VLC coding methods have recently been the subject of patent litigation. Thus, there is a need in the art for alternate methods that can replace commonly used 2D-VLC methods that have been the subject of such litigation.

SUMMARY

Described herein are a method, an apparatus, and carrier medium to encode a series of signals having the most likely-to-occur value and at least one other value. The application is for encoding a series of quantized transform coefficients of a block of image data. One method embodiment includes, in a first region, identifying events that each includes a run of zero-valued coefficients preceding a run of one or more non-zero-valued coefficients, and for each such event, jointly encoding the run lengths of the preceding run of zero-valued coefficients and the following run of non-zero-valued coefficients with a codeword, such that for at least some events, relatively more likely-to-occur pairs of runlengths are encoded by a shorter codeword than relatively less likely-to-occur runlengths. The method further includes encoding each amplitude in the run of consecutive non-zero-valued coefficients, and encoding the signs of such coefficients. The method is applicable to encoding a region in the series where there is likely to be a cluster of non-zero-valued coefficients. Other features, advantages, and aspects will be apparent from the description and claims herein.

BRIEF DESCRIPTION OF THE DRAWINGS

FIG. 3 shows a table of statistics of events according to a prior art 2-D VLC method.

FIG. 4 shows a code table for coding events according to a prior art 2-D VLC method.

FIGS. 5A-5D show tables that each show examples of events according to an embodiment of the invention. In the patterns, an "x" indicates a non-zero value.

FIG. 6 shows a table of statistics collected for events of runs of none or more zero-valued-coefficients followed by a run of non-zero-valued coefficients according to an embodiment of the invention.

FIG. 7 shows a table of variable length codes for events of runs of none or more zero-valued-coefficients followed by a run of non-zero-valued coefficients according to an embodiment of the invention.

FIGS. 8A-8F show tables that each show examples of events according to an improved embodiment of the invention in which events of runs of zero-valued coefficients followed by runs of non-zero-valued coefficients include a following zero-valued coefficient. The events are truncated to cover no more than 12 consecutive coefficients.

FIG. 9 shows a table of statistics collected or assumed for events of runs of none or more zero-valued-coefficients followed by a run of non-zero-valued coefficients followed by a single zero-valued-coefficient according to an embodiment of the invention.

FIG. 10 shows a table of variable length codes for events of runs of none or more zero-valued-coefficients followed by a run of non-zero-valued coefficients followed by a single zero-valued-coefficient according to an embodiment of the invention.

FIG. 11 shows a table of actual statistics for a sample image for a first region with a breakpoint of 12 that forms a soft boundary. Note that the event skip is the same as the event R(12,0).

DETAILED DESCRIPTION

Figure 1:
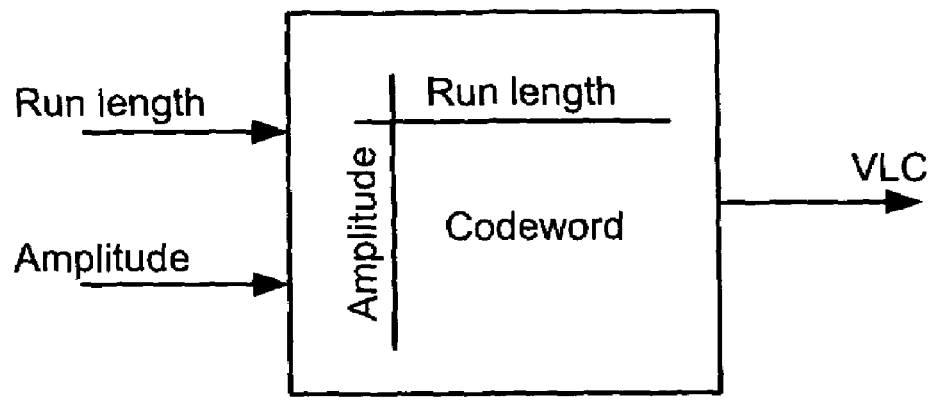
FIG. 1 shows how a prior art 2-D VLC method may be implemented by a table look-up.
Figure 2:
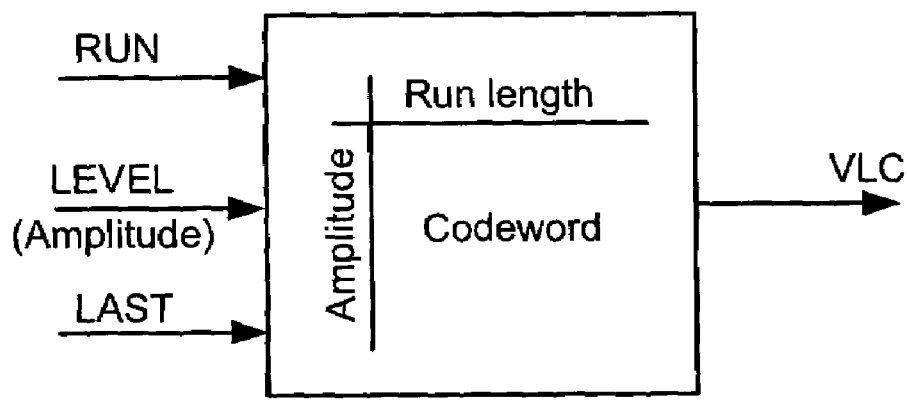
FIG. 2 shows how a common prior art variation of 2-D VLC called 3D-VLC may be implemented by a table look-up.

An aspect of the present invention encodes, using a variable length code, events of a run of consecutive zero-valued coefficients that are followed by a run of consecutive-non-zero-valued coefficients followed by single zero-value. The inventors believe this provides an efficient code for a series of coefficients, or a region of such a series wherein the non-zero-valued coefficients may cluster.

Consider first traditional 2D-VLC. FIG. 3 shows Table 1 that presents, as an example, the statistics of events for traditional 2D-VLC tabulated as a two dimensional table. In the table, $S_{2D}(z,m)$ is the likelihood expressed, for example, as a relative number of occurrences of a run of i consecutive zero-valued-coefficients, $z=0, 1, 2, \ldots$ followed by an amplitude of m, $m=1, 2, \ldots$ In 2D-VLC, a variable length code such as an optimal code is assigned to each, or least some of the events that have an $S_{2D}(z,m)$ above, with the most likely-to-occur element having the shortest number of bits, and the least occurring event coded using the longest number of bits. FIG. 4 shows Table 2 that presents, as an example, a 2D-VLC table where $C_{2D}(z,m)$ is the codeword used to encode the event of the combination of z consecutive 0-valued coefficients followed by a single non-zero coefficient of magnitude or amplitude m, $i=0, 1, \ldots$ and $m=1, 2, \ldots$ Suppose the series of quantized transform coefficients is:
5100342000201030000000000000000000000010000000 00000010000000000000.

Such a series would be encoded in conventional 2D-VLC as:

$C_{2D}(0,5)+C_{2D}(0, 1)+C_{2D}(2,3)+C_{2D}(0,4)+C_{2D}(0,2)+C_{2D}(3,2)+C_{2D}(1,1)+C_{2D}(1,3)+C_{2D}(21,1)+C_{2D}(13,1)+$EOB where + represents concatenation, and where $C_{2D}(z,m)$ denotes the 2D-VLC code, z denotes the number of zero-value coefficients preceding a non-zero-amplitude value, and m represents the amplitude—also called magnitude ignoring the sign—value to be encoded, and where EOB represents a code that indicates the end of the block, i.e., all remaining coefficients are zero-valued. Note that the above does not include encoding the sign of the coefficients. Those in the art will understand that coefficients may be positive or negative, and that each non-zero coefficient value is therefore further encoded by a sign bit to indicate the sign, or, in an alternate embodiment, each non-zero coefficient is encoded in its entirety including the sign. Signs are not included in the discussion in order not to obscure the inventive aspect.

It is common to separately encode the DC term—the first transform coefficient—using a separate amplitude code. Let DC(m) indicate the codeword for the DC amplitude. In such a method, the above set of coefficients would be encoded using conventional 2D-VLC as:

$DC(5)+C_{2D}(0, 1)+C_{2D}(2,3)+C_{2D}(0,4)+C_{2D}(0,2)+C_{2D}(3,2)+C_{2D}(1,1)+C_{2D}(1,3)+C_{2D}(21,1)+C_{2D}(13,1)+$EOB wherein EOB is the code indicating that the remainder of the series is a run of zero-valued coefficients and + represents concatenation. In practice, some of the less likely-to-occur events are coded with an escape code followed by a fixed length codeword.

The Basic Hybrid and Extended Hybrid VLC Methods use the observation that for many series of quantized transform coefficients, there is a breakpoint that defines a first region in which there are non-zero-valued coefficients that are clustered, and a second, e.g., high-frequency region in which most non-zero-valued coefficients are scattered. In the first region, runs of zero-valued coefficients and runs of non-zero-valued coefficients are identified. A first variable length code is used for the runs of zero-valued coefficients, and a second runlength code is used for the runs of non-zero-valued coefficients. Thus, two one-dimensional runlength codes are alternately applied. The DC is separately encoded. It is assumed that the series starts with a run of non-zero-valued coefficients, and a particular codeword indicates that this is a null run, i.e., that the series starts with a zero-valued coefficient.

Consider the series above (excluding the DC term):
100342000201030000000000000000000000100000000 0000010000000000000.

Consider first the Basic Hybrid Method. Assume for simplicity that no sign bits are included in the coding. Suppose that a breakpoint is established at 15 that defines a first region up to 15 wherein the non-zero-coefficients tend to cluster, and a second region wherein the non-zero-valued coefficients tend to scatter. In such a case, denoting by x a non-zero-valued coefficient, the first region of the series (without a DC term) may be written as:

x00xxx000x0x0x and the second region as:

0000000000000000000x0000000000000x000000000000.

Denote by rn the run of n consecutive non-zero coefficients, and r'z the run of z consecutive zero-valued coefficients in the first region, n,z=1,2, . . . . The ordered sequence of the example then starts with:

r1 r'2 r3 r'3 r1 r'1 r1 r'1 r1 SKIP

For the second region, denote by r"z, z=0,1, . . . , runs of consecutive zero-valued coefficients. Then, according to the Basic Hybrid method, the second region has the events:

r"20 r"13 End where SKIP denotes that the remainder of the coefficients to the breakpoint are zero and End denotes that the remainder of the coefficients are zero.

Denote by cn the variable length code according to a first variable length coding method for encoding the runlengths of the non-zero-valued coefficients. Similarly denote by c'z the variable length code according to a second variable length coding method for encoding the runlengths of the zero-valued coefficients in the first region. Further denote by Am the codeword used to encode the amplitude m, m=1, 2, . . . of non-zero-valued coefficients in the first region according to a first amplitude coding method, and denote by A"m the codeword used to encode the amplitude m, m=1, 2, . . . of non-zero-valued coefficients in the second region according to a second amplitude coding method.

Leaving out sign bits, the first region would then be encoded as:

c1+A1+c'2+c3+A3+A4+A2+c'3+c1+A2+c'1+c1+A1+c'1+c1+A3+Skip and the second region would be encoded as:

c"20+A"1+r"13+A"1+EOB where Skip and EOB represent codewords indicating that the remainder of the series has only zero-valued coefficients, and +represents concatenation. Note that according to the Extended Hybrid Coding Method, coefficient amplitudes are assumed to be 1, such that runs of zero-valued-coefficients ending in a single amplitude-1-coefficient require no further amplitude encoding. Amplitudes greater than 1 are encoded by an exception code followed by an amplitude code for amplitudes greater than 1. Thus, the second region would not include the amplitude codes, since they are for amplitude 1.

In practical implementations of conventional 2D-VLC, in order to reduce the size of the coding tables, some of the less likely-to-occur events are encoded with fixed length codewords that are preceded with what are called escape codes.

One aspect of the present invention is avoiding using escape codes.

Another aspect of the present invention is a method that includes, for a first region of the series, identifying one or more events, each including a run of zero-valued coefficients followed by a run of non-zero-valued coefficients. The method further includes encoding each such identified event by a single variable length code, e.g., from a single table. With the Basic and Extended Hybrid Methods, such pair of events would be encoded by two codewords according to the first and the second one-dimensional runlength coding methods.

In one embodiment, the first region is the whole series of the quantized transform coefficients. For simplicity, this case will be the first considered.

Each identified event may be defined by the runlengths of the zero-valued and non-zero-valued coefficients. Denote by R'(z,n) a run of z consecutive zero-values coefficients followed by n non-zero-valued coefficients, with z=0,1, 2, . . . , and n=1, 2, 3. . . , such that a "run" of no preceding zero-valued coefficients is included.

FIGS. 5A-5D show Tables 3A-3D that each show examples of events. In the patterns, an "x" indicates a non-zero value.

Consider again the series:

510034200020103000000000000000000000000100000000
00000100000000000000.

The events of the such a series, excluding the DC term (the amplitude 5) and not including any sign data, are:

R'(0, 1),R'(2,3),R'(3, 1),R'(1, 1),R'(1, 1),R'(21,1),R'(13, 1),End where End indicates the remainder of the series consists of zero-valued-coefficients.

In one implementation, statistics are collected or assumed for each event, e.g., in a table such as Table 4 shown in FIG. 6, in which S'(z,n) denotes the assumed or measured relative likelihood for the event R'(z,n), z=0, 1, 2, . . . and n=1, 2, . . . Table 5 shown in FIG. 7 is a variable length code table formed based on the assumed or collected statistics of Table 4. In Table 5, C'(z,n) denotes the variable length code for the event R'(z,n), z=0, 1, 2, . . . and n=1, 2, . . . . Note that in one implementation, such a table is used to encode only a region, e.g., the first low frequency region of a series of coefficients. For such a situation, a code is also needed to indicate that all coefficients are zero, in order to skip to the next region.

Further, any non-zero-valued coefficients are encoded by an amplitude code, which in one embodiment is implemented by using variable length code presented as a coding table according to the assumed or collected statistics. Let Am, m=1, 2, . . . , denote the code for the quantized value m according to the amplitude coding table.

Thus, for the above series, excluding the DC term and the sign of the coefficients, the series would be coded as follows:

C'(0, 1)+A1+C'(2,3)+A3+A4+A2+C'(3, 1)+A2+C'(1,1)+A1+C'(1, 1)+A3+C'(21,1)+A1+C'(13,1)+A1+EOB where EOB is the codeword for End that indicates all the remaining codewords are 0, and where + indicated concatenation.

Since a run of non-zero-valued coefficients is followed by at least one zero-valued coefficient, or ends the series, in an improved implementation, events identified and encoded by the method include a run of zero-valued coefficients followed by a run of non-zero-valued-coefficients, followed by a single zero-valued coefficient. With such events, more coefficients are encoded by each event. The coding is expected to provide more compression.

The possible number of such events is rather large, so that the code table that results may be rather large. In conventional prior art 2D-VLC, the size of the table is restricted by adding Escape codes followed by fixed length codes for events that are less likely-to-occur. In one embodiment of the present invention, the size of the code table is also limited such that events up to a maximum total number of coefficients only are encoded, with an additional code provided for an event of all zeroes of the maximum length, and for maximal length events that end in a non-zero-coefficient. These special maximal-length events provide for avoiding using escape codes.

Thus denote by R(z,n) a run of z consecutive zero-values coefficients followed by n non-zero-valued coefficients followed by a single zero-valued coefficient, with z=0, 1, 2, . . . , and n=1, 2, 3, . . . . Suppose the events are truncated to no more than 12 coefficients. Then for those events of length less than 12, z+n=11. Some of the events of 12 coefficients for which z+n=12 are events that end in a non-zero-valued coefficient and can be considered "truncated" in that, if followed by an event that starts with a non-zero-valued coefficient, such events avoid using Escape codes. One event, R(12,0) of all zeroes is also a truncated event.

As an example, FIGS. 8A-8F show Tables 6A-6F, respectively, that each show examples of events. In the patterns, an "x" indicates a non-zero value. The events are truncated to cover no more than 12 consecutive coefficients. Events of length 12 for which z+n=12 are indicated by "No zero at end; avoids escape" in FIG. 8F. Also, the event R(12,0) is shown and marked "All zeroes."

FIG. 9 shows Table 7 of collected or assumed relative likelihoods for events of runs of none or more zero-valued-coefficients followed by a run of a number of non-zero-valued coefficients followed by a single zero-valued-coefficient, except that some length 12 events according to an embodiment of the invention, do not so end. Those length-12 events distinguished by having z+n=12 are shown in boldface, and may be used to avoid end or Escape codes.

FIG. 10 shows Table 8 of variable length codes for the events shown in FIG. 9 according to the statistics of FIG. 9. The codes are for runs of none or more zero-valued-coefficients followed by a run of non-zero-valued coefficients followed by a single zero-valued-coefficient according to an embodiment of the invention.

The amplitudes are encoded according an amplitude code, which in one embodiment is a variable length code described by a one dimensional amplitude table. Denote by $A_m$ the code for the amplitude m, m=1,2, . . .

Consider again the series:

5 10 03420 0020 10 30 000000000000 0000000010 000000000000 10 000000000000 where the first value is the DC value. The events of the such a series, excluding the DC term and not including any sign data, are:

R(0,1),R(1,3),R(2,1),R(0,1),R(0,1),R(12,0),R(8,1),R(12,0),R(0,1),End, where End indicates the remaining coefficients are all zero-valued. The series is encoded using Table 8 of FIG. 10 as:

C(0,1)+A1+C(1,3)+A3+A4+A2+C(2,1)+A2+C(0,1)+A1+C(0,1)+A3+C(12,0)+C(8,1)+A1+C(12,0)+C(0,1)+A1+EOB, where EOB indicates the end of block, i.e., that the remainder of the series is zero-valued coefficients. Recall, again, that the above assumes no sign information and excludes the DC term.

Multiple Regions

The inventors observed that in actual series of quantized transform coefficients of image blocks, there is typically at least one breakpoint that defines at least two regions such that non-zero coefficients cluster in one region, and tend to be scattered in the second region. This is the basis of the Basic and Extended Hybrid Coding Methods.

Two Regions

The variable length coding method described herein is suitable for coding the whole region or any region. For example, the variable length coding method described is applicable to any region where non-zero-valued coefficients are clustered. According to the above-described Basic Hybrid and Extended Hybrid VLC Methods, an event R'(z,n) would be encoded by two runlength coding tables and a single amplitude coding table. Using aspects of the present invention, such an event may be encoded by a single runlength coding table and a single amplitude coding table. Furthermore, there may be regions where the statistics for such events are significantly different. For example, the inventors observed that at the start of a block, the first cluster of quantized coefficients has larger amplitudes than the later clusters.

In a first embodiment, the coding method includes establishing a breakpoint along the path of the ordering of the coefficients to identify a first, e.g., low-frequency region and a second, e.g., high frequency region. The encoding of the coefficients in the first region includes identifying a joint event that includes a first run of one or more consecutive zero-valued coefficients followed by a second run of consecutive none or more non-valued coefficients followed by a single zero-valued coefficient. Each such event is identified by the number of zero-valued coefficients in the first run and the number of zero-valued coefficients in the second run.

In one version, each identified event only includes up to a pre-determined number of coefficients, called the maximal length herein. In such a situation, there may be a need for encoding a sequence of consecutive zero-valued coefficients followed by a run of non-zero coefficients, with the two runlengths being greater than the maximal length. For example, if the maximal length is 12, there would be a need to encode the following:

000xxxxxxxxxxxxx0

If any length events would be allowed, this would correspond to R(3,13). However, if the maximal length is 12, one embodiment splits this up into a first event:

000xxxxxxxxx and a second event:

xxxx0.

Thus, in one embodiment in which a maximal length is defined, possible events include sequences that have the maximal length, and that end in a sequence of one or more non-zero-valued coefficients without the ending zero-valued coefficient. Such events would typically be followed in a region. This provides for encoding an event with more than the pre-determined number of coefficients as a plurality of events of at most the maximal length without using escape codes. Two or more events that together define a run of less than the maximal length zero-valued coefficients followed by a run of any length of non-zero-valued coefficients is called a "generalized event" herein in that it is treated as a single event for some purposes, including, for example, establishing the first and second region using what is called a soft boundary. See below for more details.

Furthermore, when a maximal length id is defined for an event, an event of all zero-valued coefficients is also defined to provide for coding of a "generalized event" that includes more than the maximal length of zero-valued coefficients followed by one or more non-zero valued coefficients followed by a single zero-valued coefficient.

How to establish the breakpoint is described in the Basic Hybrid Coding Method. One version uses a fixed breakpoint between the first, e.g., low frequency region, and the second, e.g., high frequency region. In one embodiment, the fixed breakpoint is pre-determined for each type of image and for each type of compression method by running experiments collecting statistics on a set of typical samples such images. Typically, different breakpoints are determined for:

intraframe and still image coding vs. interframe coding;
standard definition television images (SDTV) vs. HDTV images;
high bit rate coding methods vs. low bit rate coding methods;
DCT vs. non-DCT transforms;

and so forth.

When fixed breakpoints are used, there is already an indication passed on to the decoder to indicate the type of image, e.g., whether interframe or intraframe. Thus, there is typically no need to send a further indication to the decoder of the breakpoint.

The inventors performed experiments on typical still images—applicable also to intraframe images in motion coding—by performing variable length coding according to embodiments of the present invention, and plotting the size of the compressed image for different breakpoint values for the case of 8 by 8 blocks quantized to 127 non-zero amplitudes using the DCT, and observed that a breakpoint of 22 worked for most images, although some images worked well with a breakpoint of about 12. Therefore, in one embodiment for intraframe and still images for DCT transform coding, a pre-selected fixed breakpoint of 22 was used.

In a first variation, the breakpoint is image dependent and selected from a finite set according to a breakpoint selection criterion. For example, from the above-described experiments, the compression using a first breakpoint of 22 was compared to the compression using a second breakpoint of 10, and the breakpoint that gave the higher compression was used. Other breakpoint selection criteria also are possible, e.g., by looking at the statistics of runs of zero-valued coefficients and non-zero-valued coefficients.

When such an image-dependent breakpoint is used, an indication of the breakpoint is also sent with each set of coefficients. In one embodiment, a 2-bit indication is sent. This provides for each block to be encoded using one of 4 pre-defined breakpoints. In an alternate embodiment, the indication of which pre-defined breakpoint is sent as a variable length code such that more common breakpoints are encoded by a shorter code.

While typically, the set of possible breakpoints is a small subset of the possible positions in the series, in yet another variation, the image dependent breakpoint is selected from anywhere in the series, or, in an alternate variation, from anywhere along a subrange.

In an improved embodiment, instead of the breakpoint defining a fixed boundary between the first and second region, called a "hard" boundary herein, or a set of breakpoints defining a set of hard breakpoints, such that an event or generalized event that includes a sequence of up to the maximal length of consecutive zero-valued coefficients followed by a run of non-zero values that crossed the breakpoint would be regarded as a generalized event in the first region up to the breakpoint. In such a case, the breakpoint defines what is called herein a "soft" boundary in that any event that started in the first region would be encoded in the first region even if it crossed the breakpoint. Thus, the actual boundary for a particular block of coefficients might extend beyond the breakpoint.

FIG. 11 shows a table of actual statistics for events in a first region for a sample image with a breakpoint of 12 that forms a soft boundary. Note that this table includes a "skip" code to indicate to skip to the breakpoint, and corresponds to the event R(12,0) with the breakpoint at 12. In one alternate embodiment, any event R(12,0) within less that 12 coefficients from the boundary is also a skip event to skip to the start of the second region-applicable to a hard boundary, while in a second alternate embodiment applicable to a soft boundary, such an event would be included in the next region, with the boundary moved to the start of such an event.

In the above description, it is assumed that the signs of the non-zero-valued coefficients in each event are encoded using individual sign bits.

The coefficients in the second, e.g., high frequency region also may be coded by a similar method, but using a different second coding table for the events matched to assumed or measured likelihoods of the events in the second region. Such a second coding table, for example, would take into account the more scattered nature of non-zero coefficients in the second region. For relatively low-bit rate interframe coded images, such a code table would also take into account that the non-zero-valued coefficients would likely be dominated by amplitude 1.

In one alternate embodiment, traditional 2D-VLC is used for the second region.

In yet another alternate embodiment, the coefficients in the second region are encoded by a second-region method described in the Basic Hybrid Method. That is, each run of none or more zero-valued coefficients in the second region followed by a single non-zero-valued coefficient is identified and encoded by a runlength code using a variable length coding table, and the amplitude of the non-zero-valued coefficient is encoded by an amplitude coding method typically different than the amplitude coding method used for coefficients in the first region. An EOB code is used to indicate all remaining coefficients are zero-valued. A sign bit is used to encode the sign of the non-zero-valued coefficient.

In yet another alternate embodiment, the coefficients in the second region are encoded by a second-region method described in the Extended Hybrid Method that assumed non-zero-valued coefficients are dominated by amplitude-1 coefficients, such that no amplitude coding is used to encode an amplitude-1 coefficient, and an exception code followed by a codeword is used to encode any non-amplitude-1 coefficient. That is, each run of none or more zero-valued coefficients in the second region followed by a single non-zero-valued coefficient is identified and encoded by a runlength code using a variable length coding table. Any non-amplitide-1, non-zero coefficient is identified by an exception code and, for example, encoded by an Escape code, and the amplitude of such non-zero-valued, non-amplitide-1 coefficient is encoded by an amplitude coding method typically different than the amplitude coding method used for coefficients in the first region. An EOB code is used to indicate all remaining coefficients are zero-valued. A sign bit is used to encode the sign of the non-zero-valued coefficient.

More than Two Regions

An alternate embodiment includes more than two regions, i.e., more than one breakpoint defining the more than two regions. The inventors, for example, have observed that the first cluster of non-zero-valued coefficients often have larger amplitude values than later clusters of non-zero-valued coefficients. Therefore, in one embodiment, a first region is defined by the first event of a run of none or more zero-valued coefficients followed by a run of consecutive non-zero-valued coefficients followed by a single zero-valued coefficient. Such an event is coded using a first variable length code, e.g., a first variable length coding table. The amplitudes of the non-zero-valued coefficients are coded using a first amplitude coding method, e.g., a first variable length amplitude code. The signs of each non-zero coefficient also are encoded using a sign bit. The first variable length event code and the first amplitude coding method are constructed based on actual or assumed statistics for the first event in the series, ignoring the DC term.

A breakpoint is selected to define a second and a third region. The coding of the coefficients of the second region includes identifying events that include a first run of one or more consecutive non-zero-valued coefficients followed by a single zero-valued coefficient, followed by a second run of consecutive none or more zero-valued coefficients. Each such event is identified by the number of non-zero-valued coefficients in the first run and the number of zero-valued coefficients in the second run. Each identified event only includes up to the maximal length of coefficients. Each identified event is encoded by a second variable length code, e.g., using a second variable length coding table. Furthermore, the amplitudes of the non-zero-valued coefficients are coded using a second amplitude coding method, e.g., a second variable length amplitude code. The signs of the non-zero-valued coefficients are encoded by corresponding sign bits. The third region is encoded by the method described for the high frequency region in the Extended Hybrid Method that assumed non-zero-valued coefficients are dominated by amplitide-1 coefficients, such that no amplitude coding is used to encode an amplitude-1 coefficient, and an exception code followed by a codeword is used to encode any non-amplitude-1 coefficient.

Other alternate methods that include more than two regions are also included in the scope of the invention. One coding method includes using two breakpoints to define a first, second, and third region. In the first region, runs of non-zero-valued coefficients and runs of zero-valued coefficients are identified, and the runlengths of the non-zero-amplitude and zero-amplitude coefficients are encoded using a first runlength coding: method and a second runlength coding method. In the second region, runs of coefficients of amplitude-one, and runs of zero-valued coefficients are identified, and the runlengths of the amplitude-one and zero-amplitude coefficients are encoded using a third runlength coding method and a fourth runlength coding method, respectively. In the third region, runs of zero-valued coefficients are identified, and the runlengths of such zero-valued-runs are encoded using a fifth runlength coding method.

Alternate coding methods may be used for the third, e.g., high-frequency region, as described above for the two-region methods. For example, the third region may use conventional 2D-VLC, or in another embodiment, the third region can use the high frequency coding method of the Basic Hybrid Method, or in yet another embodiment in which it may be assumed that any non-zero-valued coefficients in the third region are dominated by amplitide-1 coefficients, the third region can use the high frequency coding method of the Extended Hybrid Method.

As an example, consider the series of quantized coefficients:

5 00003420 00000030 000000 1000000000000 0010 000000000000 10 000000000000.

Suppose the encoding is such that the first event defines the first region, and a breakpoint along the ordering defines the second and third regions. Suppose further that the first coefficient is the DC value, and let DC(a) be the codeword for a DC amplitude of quantized value a. Suppose further that the above described variable length coding of zero-valued runs followed by non-zero-valued runs is used, with a maximal length defined for any event. Denote by C0(z,n), C1(z,n), and C2(z,n), z=0,1, . . . , n=1, 2, . . . the variable length codewords for the first region event, events in the second region, and events in the third region respectively, each event being of z zero-valued coefficients followed by n non-zero-valued coefficients followed by a single zero-valued coefficient, unless z+n=the maximal length. For this example, suppose the breakpoint to define the second and third region is at 22 and defines a soft boundary. Let A0(a), A1(a) and A2(a) denote the codewords of an amplitude in the first, the second, and the third regions, respectively, as determined by a first, second, and third amplitude coding method. In one embodiment, these amplitude coding methods are variable length coding methods that differ. For example, in the first region, a large amplitude is more likely-to-occur than in the second region. Such a relatively high amplitude is even less likely-to-occur in the third region.

Ignoring the signs of the amplitudes, the above series would be encoded as:

DC(5)+C0(4,3)+A0(3)+A0(4)+A0(2)+C1 (6,1)+A1 (3)+ C1 (12,0)+C2(8,1)+A2(1)+C2 (12,0)+C2(0,1)+A2(1)+ EOB where EOB is a codeword indicating the end of table, and +denotes concatenation. Note that the run of six zero-valued coefficients before the breakpoint moves to the next region because the soft boundary moves to before the six zero-valued coefficients.

Note that in this implementation, C0(12,0), C1(12,0) and C2(12,0) are the codewords for events of 12 zero-valued coefficients, or, if within 12 coefficients of a breakpoint, the codewords to indicate skip-to-breakpoint in the case of a hard boundary, or the soft boundary moves to the start of the zero-valued coefficients of the event in the case of a soft boundary.

In an actual implementation, each amplitude would also have a sign, and the encoding would also include a sign bit. Let $S_+$ and $S_-$ denote the code bits for a positive and negative amplitude, respectively. Suppose the series of quantized coefficients to encode is:

5 0000+3−4−2+10 000000+30 000000 1000000 000000 00−10 000000000000+10 000000000000.

The, with sign bits, according to the same embodiment, the series would be encoded as:

DC(5)+C0(4,4)+A0(3)+$S_+$+A0(4)+$S_-$+A0(2)+$S_-$+A0 (1)+$S_+$+C1(6,1)+A1 (3)+$S_+$+C1 (12,0)++C2(8,1)+A2 (1)+$S_-$+C2(12,0)+C2(0,1) +A2(1)+$S_+$+EOB.

In another version the encoding of the non-zero-values includes the sign.

Apparatus

Figure 12:
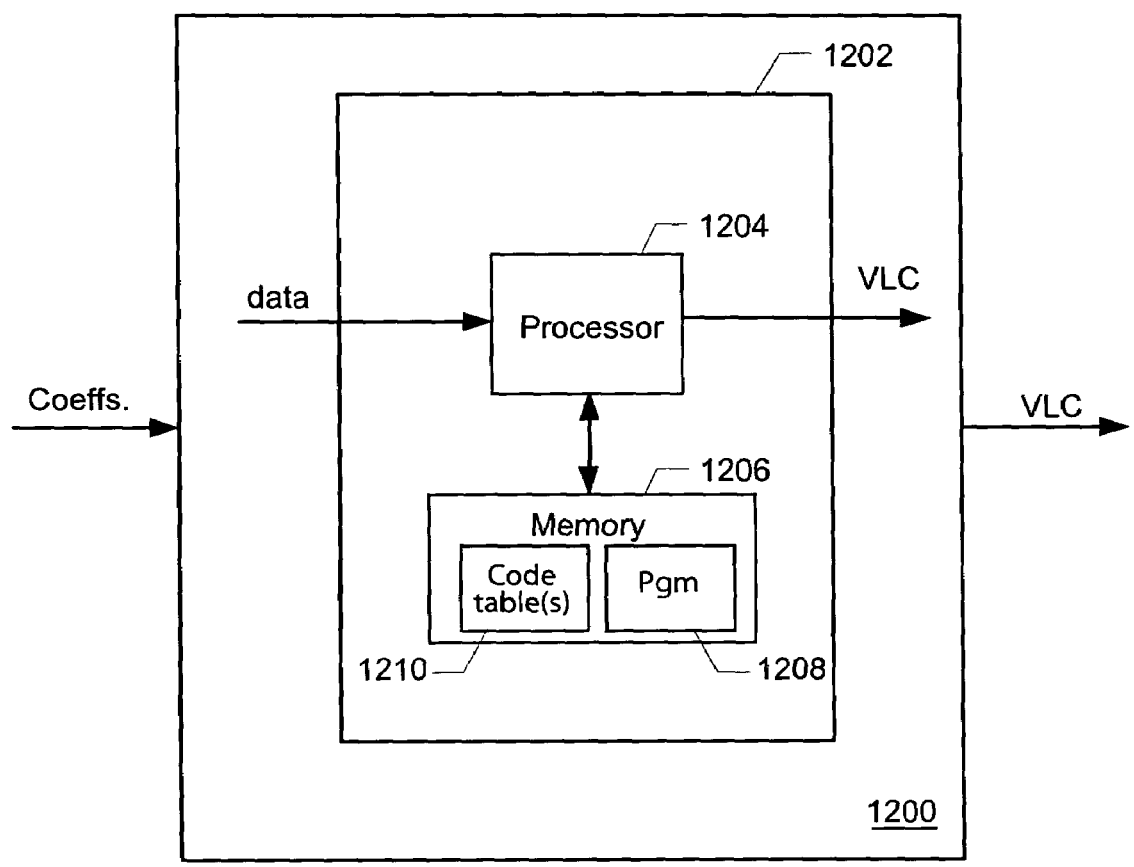
FIG. 12 shows an apparatus embodiment that includes a processing system with a processor and a memory implementing the coding methods described herein.

Another aspect of the invention is an apparatus for coding a series of digital signals, e.g., an ordered series of quantized coefficients of a transformed block of image data. FIG. 12 shows an apparatus 1200 that includes a processing system 1202 that includes one or more processors 1204 and a memory 1206. A single processor is shown in FIG. 12 and those in the art will appreciate that this may represent several processors. Similarly, a single memory subsystem 1206 is shown, and those in the art will appreciate that the memory subsystem may include different elements such as RAM, ROM, and so forth. In addition, the memory subsystem is meant to include any non-volatile memory storage such as a magnetic or optical storage component. A computer program 1208 is included and is loaded into the memory 1206. Note that at any time, some of the program may be in the different parts of the memory subsystem, as will be understood by those in the art. The program 1208 includes instructions to instruct the processor to implement, in different versions, the different coding methods described above. The processor thus accepts as data the ordered coefficients and generates the codewords. The apparatus 1200 further includes in the memory subsystem 1206 a coding data structure 1210 that provides the codewords for sets of one or more coefficients as described in any one of the novel coding methods described herein. In one embodiment, the data structure is in the form of one or more tables.

Note that FIG. 12 does not show details such as bus structures, I/O structures, etc., that may be included since the need for such structures would be known to those in the art and their inclusion would only obscure the inventive aspects of the apparatus. Furthermore, the processing system may be implemented using one or more general purpose microprocessors, one or more microcontrollers that include several memory and other elements, one or more DSP devices, or any other programmable processors. Furthermore, the processors may be standalone devices, or may be implemented as "cores" to be included in an ASIC, gate array, or other device.

Another aspect of the invention is a memory (such as memory 1206 in FIG. 12) that stores a coding data structure that provides the codewords for sets of one or more coefficients as described in any one of the novel coding methods described herein. In one embodiment, the data structure is in the form of one or more tables.

Thus, a variable length coding method and apparatus has been described suitable for encoding the quantized transform coefficients of blocks of images as occur in common image compression methods.

One embodiment of each of the methods described herein is in the form of a computer program that executes on a processing system, e.g., one or more processors that are part of an image coder. Thus, as will be appreciated by those skilled in the art, embodiments of the present invention may be embodied as a method, an apparatus such as a special purpose apparatus, an apparatus such as a data processing system, or a carrier medium carrying computer readable code, e.g., a computer program product or a carrier wave. The carrier medium carries one or more computer readable code segments for instructing a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium or a carrier wave) carrying computer-readable program code segments embodied in or carried by the medium.

While the carrier medium is shown in an exemplary embodiment to be a single medium, the term "carrier medium" should be taken to include a single medium or multiple media (e.g., in a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, and/or volatile media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. For example, the term "carrier medium" shall accordingly be taken to include, but not be limited to, solid-state memories, optical media, and/or magnetic media.

It will be understood that the methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in some of the above examples for amplitude encoding, 127 possible non-zero values are assumed for the coefficients, the invention is not restricted to any number of possible quantization values.

Note also that the term amplitude is irrespective of sign. Therefore, for example, coefficient of values +1 and −1 both have amplitude 1.

In some of the embodiments described above, no sign data was included. Most transforms produce positive and negative coefficients, and the forming of the codeword includes an indication of the sign of any non-zero-valued coefficients. In one version, the sign information for any runs of non-zero amplitudes in any region is added together with the information of each amplitude. In an alternate embodiment, the sign information for any runs of non-zero amplitudes in any region may be included in a different manner, e.g., as a code for the series of signs. Other alternate embodiments are also possible for encoding the sign.

Note that the terms coding and encoding are used interchangeably herein.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for operating hardware for processing an ordered series of digital signals that each has a value including an amplitude from a finite set of amplitudes consisting of the most likely-to-occur amplitude and at least one other amplitude, the processing to reduce the amount of data used to represent the digital signals and to form codewords such that the more likely-to- occur values or sequences of values of digital signals are represented by relatively short codewords and the less-likely-to-occur values or sequences of values of digital signals are represented by relatively long codewords, the method comprising:

for a first contiguous region in the series:
identifying events that each includes a run of consecutive coefficients of the most likely- to-occur amplitude, preceding a run of one or more consecutive signals having any value other than the most likely-to-occur amplitude, including events of no coefficients of the most likely-to-occur amplitude preceding a run of one or more consecutive coefficients having other than the most likely-to-occur amplitude;

for each identified event, jointly encoding the run lengths of the preceding run of the most likely-to-occur amplitude and the following run of other than the most likely-to-occur amplitude with an event codeword, such that for at least some events, relatively more likely- to-occur pairs of runlengths are encoded by a shorter event codeword than relatively less likely-to-occur runlengths;

for each identified event, encoding each amplitude in the run of consecutive signals having other than the most likely-to-occur amplitude, the encoding of each amplitude being according to an amplitude coding method to generate an amplitude codeword, wherein the amplitude coding method encodes the amplitudes in, and not the runlength of the run of consecutive signals having other than the most likely-to-occur amplitude, such that relatively short codewords are formed to represent values or sequences of values that are relatively more likely-to-occur, and relatively long codewords are formed to represent values or sequences of values that are relatively less likely-to-occur.

2. A method as recited in claim 1,
wherein the series of digital signals is a series of quantized coefficients of a transformed block of image data formed by a transform such that the most likely-to-occur amplitude is 0, and the next most likely-to-occur amplitude is 1, such that the identifying of events identifies events that each includes a run of zero-valued coefficients preceding a run of one or more non-zero-valued coefficients, including events of no zero-valued coefficients preceding a run of non-zero-valued coefficients.

3. A method as recited in claim 2, wherein the transformed block of image data includes a DC term, and wherein the DC term is separately encoded, such that the series of digital signals is a set of non-DC quantized coefficients of a transformed block of image data.

4. A method as recited in claim 2, further comprising in the first region:
for each identified event, encoding the signs of the non-zero-valued coefficients in the run of non-zero-valued coefficients.

5. A method as recited in claim 2, further comprising:
providing a breakpoint defining the first contiguous region along the ordering of the series followed by a second continuous region; such that the coefficients of the first region are encoded by a first encoding method that includes the identifying of events, the jointly encoding the runlengths of the events, and the encoding the amplitudes of non-zero-valued coefficients of the events; and
encoding the coefficients in the second region using a second region encoding method, and
wherein the first region encoding method and the second region encoding method are such that the encoding of at least some of the coefficients or runs of coefficients in the first region is different than the encoding of at least some of the coefficients or runs of coefficients in the second region.

6. A method as recited in claim 5, further comprising:
providing at least one additional breakpoint such that the series is divided into more than two regions by the breakpoint and the one additional breakpoint for each region in addition to the second region; and
encoding the coefficients in each additional regions defined by the corresponding additional breakpoint, the respective encoding in a region using a region coding method different from the coding methods used in other regions.

7. A method as recited in claim 5, wherein the breakpoint value is pre-selected.

8. A method as recited in claim 5, wherein the breakpoint value is selected from a finite set of pre-defined breakpoint values according to an image-dependent criterion.

9. A method as recited in claim 5, wherein the second corresponding method is applicable to intraframe image data and to interframe blocks of image data, and wherein a first pre-selected breakpoint value is used for intraframe image data and a second pre-selected breakpoint value is used for interframe image data.

10. A method as recited in claim 5, wherein the breakpoint defines a hard boundary between the first and second regions.

11. A method as recited in claim 5, wherein the breakpoint defines a soft boundary between the first and second regions, such that for an identified event in the first region block having a sequence of consecutive non-zero values that crosses the breakpoint, the boundary between the first and second region is at the end of the event such that the whole event is in the first region.

12. A method as recited in claim 2, wherein the jointly encoding of the runlengths on an event uses a multidimensional coding table.

13. A method as recited in claim 2, wherein the number of events that are identified and whose run lengths are jointly encoded is limited such that only events up to a maximum total number of coefficients (the "maximal length") are identified, and wherein the identifying also identifies events of all zeroes of the maximum length, and maximal length events that end in a non-zero-coefficient, such that escape codes may be avoided in coding the coefficients of the first region.

14. A method as recited in claim 13, wherein the first region includes the first identified event; wherein the jointly encoding the runlengths of the event in the first region uses a first variable length coding method, and wherein the encoding the amplitudes of the non-zero-amplitudes of the event in the first region uses a first amplitude coding method, the method further comprising:

providing a breakpoint defining a second contiguous region following the first region along the ordering of the series and a third continuous region following the second region; such that the coefficients of the second region are encoded by a second encoding method, the second encoding method including:

identifying events that each includes a run of zero-valued coefficients preceding a run of one or more non-zero-valued coefficients, including an event of no zero-valued coefficients preceding a run of one or more non-zero-valued coefficients;

for each identified event in the second region, jointly encoding the run lengths of the preceding run of the most likely-to-occur amplitude and the following run of other than the most likely-to-occur amplitude with a codeword, such that for at least some events, relatively more likely-to-occur pairs of runlengths are encoded by a shorter codeword than relatively less likely-to-occur runlengths, the jointly encoding the run lengths of events in the second region using a second coding method;

for each identified event in the second region, encoding each amplitude in the run of consecutive signals having other than the most likely-to-occur amplitude, the encoding according to a second amplitude coding method; and encoding the coefficients in the third region using a third region encoding method.

15. A computer readable hardware medium having instructions coded thereon that when executed by one or more processors cause execution of a method for processing an ordered series of digital signals that each has a value including an amplitude from a finite set of amplitudes consisting of the most likely-to-occur amplitude and at least one other amplitude, the processing to reduce the amount of data used to represent the digital signals and to form codewords such that the more likely-to-occur values or sequences of values of digital signals are represented by relatively short codewords and the less likely-to-occur values or sequences of values of digital signals are represented by relatively long codewords, the method comprising:

for a first contiguous region in the series:

identifying events that each includes a run of consecutive coefficients of the most likely-to-occur amplitude, preceding a run of one or more consecutive signals having any value other than the most likely-to-occur amplitude, including a run of no coefficients of the most likely-to-occur amplitude, preceding a run of one or more consecutive coefficients having other than the most likely-to-occur amplitude;

for each identified event, jointly encoding the run lengths of the preceding run of the most likely-to-occur amplitude and the following run of other than the most likely-to-occur amplitude with an event codeword, such that for at least some events, relatively more likely-to-occur pairs of runlengths are encoded by a shorter event codeword than relatively less likely-to-occur runlengths;

for each identified event, encoding each amplitude in the run of consecutive signals having other than the most likely-to-occur amplitude, the encoding of each amplitude being according to an amplitude coding method to generate an amplitude codeword, wherein the amplitude coding method encodes the amplitudes in, and not the runlength of the run of consecutive signals having other than the most likely-to-occur amplitude, such that relatively short codewords are formed to represent values or sequences of values that are relatively more likely-to-occur, and relatively long codewords are formed to represent values or sequences of values that are relatively less likely-to-occur.

16. A computer readable hardware medium as recited in claim 15, wherein the series of digital signals is a series of quantized coefficients of a transformed block of image data formed by a transform such that the most likely-to-occur amplitude is 0, and the next most likely-to-occur amplitude is 1, such that the identifying of events identifies events that each includes a run of zero-valued coefficients preceding a run of one or more non-zero-valued coefficients, including a run of no zero-valued coefficients preceding a run of non-zero-valued coefficients.

17. A computer readable hardware medium as recited in claim 16, wherein the transformed block of image data includes a DC term, and wherein the DC term is separately encoded, such that the series of digital signals is a set of non-DC quantized coefficients of a transformed block of image data.

18. A computer readable hardware medium as recited in claim 16, wherein the method further comprises, in the first region:

for each identified event, encoding the signs of the non-zero-valued coefficients in the run of non-zero-valued coefficients.

19. A computer readable hardware medium as recited in claim 16, wherein the method further comprises:

providing a breakpoint defining the first contiguous region along the ordering of the series followed by a second continuous region; such that the coefficients of the first region are encoded by a first encoding method that includes the identifying of events, the jointly encoding the runlengths of the events, and the encoding the amplitudes of non-zero-valued coefficients of the events; and encoding the coefficients in the second region using a second region encoding method, wherein the first region encoding method and the second region encoding method are such that the encoding of at least some of the coefficients or runs of coefficients in the first region is different than the encoding of at least some of the coefficients or runs of coefficients in the second region.

20. A computer readable hardware medium as recited in claim 19, wherein the method further comprises:

providing at least one additional breakpoint such that the series is divided into more than two regions by the breakpoint and the one additional breakpoint for each region in addition to the second region; and encoding the coefficients in each additional region defined by the corresponding additional breakpoint, the respective encoding in a region using a region coding method different from the coding methods used in other regions.

21. A computer readable hardware medium as recited in claim 19, wherein the breakpoint value is pre-selected.

22. A computer readable hardware medium as recited in claim 19, wherein the breakpoint value is selected from a finite set of pre-defined breakpoint values according to an image-dependent criterion.

23. A computer readable hardware medium as recited in claim 19, wherein the second corresponding method is applicable to intraframe image data and to interframe blocks of image data, and wherein a first pre-selected breakpoint value is used for intraframe image data and a second pre-selected breakpoint value is used for interframe image data.

24. A computer readable hardware medium as recited in claim 19, wherein the breakpoint defines a hard boundary between the first and second regions.

25. A computer readable hardware medium as recited in claim 19, wherein the breakpoint defines a soft boundary between the first and second regions, such that for an identified event in the first region block having a sequence of consecutive non-zero values that crosses the breakpoint, the boundary between the first and second region is at the end of the event such that the whole event is in the first region.

26. A computer readable hardware medium as recited in claim 15, wherein the jointly encoding of the runlengths of an event uses a multidimensional coding table.

27. A computer readable hardware medium as recited in claim 16, wherein the number of events that are identified and whose run lengths jointly encoded is limited such that only events up to a maximum total number of coefficients (the "maximal length") are identified, and wherein the identifying also identifies events of all zeroes of the maximum length, and maximal length events that end in a non-zero-coefficient, such that escape codes may be avoided in coding the coefficients of the first region.

28. An apparatus for processing an ordered series of digital signals that each has a value including an amplitude from a finite set of amplitudes consisting of the most likely-to-occur amplitude and at least one other amplitude, the processing to reduce the amount of data used to represent the digital signals and to form codewords such that the more likely-to-occur values or sequences of values of digital signals are represented by relatively short codewords and the less likely-to-occur values or sequences of values of digital signals are represented by relatively long codewords, the apparatus comprising:
  means for identifying events in a first contiguous region in the series, each event including a run of consecutive coefficients of the most likely-to-occur amplitude, preceding a run of one or more consecutive signals having any value other than the most likely-to-occur amplitude, including a run of no coefficients of the most likely-to-occur amplitude, preceding a run of one or more consecutive coefficients having other than the most likely-to-occur amplitude;
  means for jointly encoding, for each identified event, the run lengths of the preceding run of the most likely-to-occur amplitude and the following run of other than the most likely-to-occur amplitude with an event codeword, such that for at least some events, relatively more likely-to-occur pairs of runlengths are encoded by a shorter event codeword than relatively less likely-to-occur runlengths; and
  means for encoding, for each identified event, each amplitude in the run of consecutive signals having other than the most likely-to-occur amplitude, the means for encoding carrying out encoding according to an amplitude coding method to generate an amplitude codeword, wherein the amplitude coding method encodes the amplitudes in, and not the runlength of the run of consecutive signals having other than the most likely-to-occur amplitude, such that relatively short codewords are formed to represent values or sequences of values that are relatively more likely-to-occur, and relatively long codewords are formed to represent values or sequences of values that are relatively less likely-to-occur.

29. An apparatus as recited in claim 28,
  wherein the series of digital signals is a series of quantized coefficients of a transformed block of image data formed by a transform such that the most likely-to-occur amplitude is 0, and the next most likely-to-occur amplitude is 1, such that the means for identifying events includes identifying events that each includes a run of zero-valued coefficients preceding a run of one or more non-zero-valued coefficients, including a run of no zero-valued coefficients preceding a run of non-zero-valued coefficients.

30. An apparatus as recited in claim 29, wherein the transformed block of image data includes a DC term, and wherein the DC term is separately encoded, such that the series of digital signals is a set of non-DC quantized coefficients of a transformed block of image data.

31. An apparatus as recited in claim 29, further comprising:
  means for encoding the signs of the non-zero-valued coefficients in the run of non-zero-valued coefficients for each identified event in the first region.

32. An apparatus as recited in claim 29, wherein the method further comprises:
  means for providing a breakpoint defining the first contiguous region along the ordering of the series followed by a second continuous region; such that the coefficients of the first region are encoded by a first encoding method that includes the identifying of events, the jointly encoding the runlengths of the events, and the encoding the amplitudes of non-zero-valued coefficients of the events; and
  means for encoding the coefficients in the second region using a second region encoding method,
  wherein the first region encoding method and the second region encoding method are such that the encoding of at least some of the coefficients or runs of coefficients in the first region is different than the encoding of at least some of the coefficients or runs of coefficients in the second region.

33. An apparatus as recited in claim 32, further comprising:
  means for providing at least one additional breakpoint such that the series is divided into more than two regions by the breakpoint and the one additional breakpoint for each region in addition to the second region; and
  means for encoding the coefficients in each additional region defined by the corresponding additional breakpoint, the respective encoding in a region using a region coding method different from the coding methods used in other regions.

34. An apparatus as recited in claim 32, wherein the breakpoint value is pre-selected.

35. An apparatus as recited in claim 32, wherein the breakpoint value is selected from a finite set of pre-defined breakpoint values according to an image-dependent criterion.

36. An apparatus as recited in claim 32, wherein the second corresponding method is applicable to intraframe image data and to interframe blocks of image data, and wherein a pre-selected breakpoint value is used for intraframe image data and a second pre-selected breakpoint value is used for interframe image data.

37. An apparatus as recited in claim 32, wherein the breakpoint defines a hard boundary between the first and second regions.

38. An apparatus as recited in claim 32, wherein the breakpoint defines a soft boundary between the first and second regions, such that for an identified event in the first region block having a sequence of consecutive non-zero values that crosses the breakpoint, the boundary between the first and second region is at the end of the event such that the whole event is in the first region.

39. An apparatus as recited in claim 29, wherein the means for jointly-encoding the runlengths on an event uses a multi-dimensional coding table.

40. An apparatus as recited in claim 29, wherein the number of events that are identified by the means for identifying and whose run lengths jointly encoded by the means for jointly encoding is limited such that only events up to a maximum total number of coefficients (the "maximal length") only are identified, and wherein the means for identifying also identifies events of all zeroes of the maximum length, and maximal length events that end in a non-zero-coefficient, such that escape codes may be avoided in coding the coefficients of the first region.

41. An apparatus including a processing system that includes a at least one processor and a storage device, the storage device configured with instructions that when executed cause the apparatus to accept an ordered series of digital signals that each has a value including an amplitude from a finite set of amplitudes consisting of the most likely-to-occur amplitude and at least one other amplitude, the apparatus to perform a method for processing an ordered series of digital signals to reduce the amount of data used to represent the digital signals and to form codewords such that the more likely-to-occur values or sequences of values of digital signals are represented by relatively short codewords and the less likely-to-occur values or sequences of values of digital signals are represented by relatively long codewords, the method comprising:
for a first contiguous region in the series:
identifying events that each includes a run of consecutive coefficients of the most likely-to-occur amplitude, preceding a run of one or more consecutive signals having any value other than the most likely-to-occur amplitude, including a run of no coefficients of the most likely-to-occur amplitude, preceding a run of one or more consecutive coefficients having other than the most likely-to-occur amplitude;
for each identified event, jointly encoding the run lengths of the preceding run of the most likely-to-occur amplitude and the following run of other than the most likely-to-occur amplitude with an event codeword, such that for at least some events, relatively more likely-to-occur pairs of runlengths are encoded by a shorter event codeword than relatively less likely-to-occur runlengths;
for each identified event, encoding each amplitude in the run of consecutive signals having other than the most likely-to-occur amplitude, the encoding of each amplitude being according to an amplitude coding method to generate an amplitude codeword, wherein the amplitude coding method encodes the amplitudes in, and not the runlength of the run of consecutive signals having other than the most likely-to-occur amplitude,
such that relatively short codewords are formed to represent values or sequences of values that are relatively more likely-to-occur, and relatively long codewords are formed to represent values or sequences of values that are relatively less likely-to-occur.

42. An apparatus as recited in claim 41,
wherein the series of digital signals is a series of quantized coefficients of a transformed block of image data formed by a transform such that the most likely-to-occur amplitude is 0, and the next most likely-to-occur amplitude is 1, such that the identifying of events identifies events that each includes a run of zero-valued coefficients preceding a run of one or more non-zero-valued coefficients, including a run of no zero-valued coefficients preceding a run of non-zero-valued coefficients.

43. An apparatus as recited in claim 42, wherein the transformed block of image data includes a DC term, and wherein the DC term is separately encoded, such that the series of digital signals is a set of non-DC quantized coefficients of a transformed block of image data.

44. An apparatus as recited in claim 42, wherein the method further comprises, in the first region:
for each identified event, encoding the signs of the non-zero-valued coefficients in the run of non-zero-valued coefficients.

45. An apparatus as recited in claim 42, wherein the method further comprises:
providing a breakpoint defining the first contiguous region along the ordering of the series followed by a second continuous region; such that the coefficients of the first region are encoded by a first encoding method that includes the identifying of events, the jointly encoding the runlengths of the events, and the encoding the amplitudes of non-zero-valued coefficients of the events; and
encoding the coefficients in the second region using a second region encoding method,
wherein the first region encoding method and the second region encoding method are such that the encoding of at least some of the coefficients or runs of coefficients in the first region is different than the encoding of at least some of the coefficients or runs of coefficients in the second region.

46. An apparatus as recited in claim 45, wherein the method further comprises:
providing at least one additional breakpoint such that the series is divided into more than two regions by the breakpoint and the one additional breakpoint for each region in addition to the second region; and
encoding the coefficients in each additional regions defined by the corresponding additional breakpoint, the respective encoding in a region using a region coding method different from the coding methods used in other regions.

47. An apparatus as recited in claim 45, wherein the breakpoint value is pre-selected.

48. An apparatus as recited in claim 45, wherein the breakpoint value is selected from a finite set of pre-defined breakpoint values according to an image-dependent criterion.

49. An apparatus as recited in claim 45, wherein the second corresponding method is applicable to intraframe image data and to interframe blocks of image data, and wherein a first pre-selected breakpoint value is used for intraframe image data and a second pre-selected breakpoint value is used for interframe image data.

50. An apparatus as recited in claim 45, wherein the breakpoint defines a hard boundary between the first and second regions.

51. An apparatus as recited in claim 45, wherein the breakpoint defines a soft boundary between the first and second regions, such that for an identified event in the first region block having a sequence of consecutive non-zero values that crosses the breakpoint, the boundary between the first and second region is at the end of the event such that the whole event is in the first region.

52. An apparatus as recited in claim 42, wherein the jointly encoding of the runlengths on an event uses a multidimensional coding table.

53. An apparatus as recited in claim 42, wherein the number of events that are identified and whose run lengths jointly encoded is limited such that only events up to a maximum total number of coefficients (the "maximal length") are identified, and wherein the identifying also identifies events of all zeroes of the maximum length, and maximal length events that end in a non-zero-coefficient, such that escape codes may be avoided in coding the coefficients of the first region.

* * * * *

UNITED STATES PATENT AND TRADEMARK OFFICE
CERTIFICATE OF CORRECTION

PATENT NO. : 7,471,840 B2  Page 1 of 1
APPLICATION NO. : 10/922508
DATED : December 30, 2008
INVENTOR(S) : Toebes et al.

It is certified that error appears in the above-identified patent and that said Letters Patent is hereby corrected as shown below:

In column 13, lines 50-51, kindly replace

"5 00003420 00000030 000000 1000000000000 0010
000000000000 10 000000000000."
with
--5 00003420 00000030 000000 | 000000000000 0010 000000000000 10
000000000000.--

In column 14, lines 31-21, kindly replace

"5 0000+3–4–2+10 000000+30 000000 1000000 000000
00–10 000000000000+10 000000000000."
with --5 0000+3–4–2+10 000000+30 000000 | 000000  000000 00–10
000000000000 +10 000000000000.--

In column 22, line 64, kindly insert --first-- between "a" and "pre-selected"

Signed and Sealed this

Thirty-first Day of March, 2009

JOHN DOLL
*Acting Director of the United States Patent and Trademark Office*